# 2,806,073
CHEMICAL BLOWING OF RUBBER

Wesley B. Curtis, Middlebury, and Byron A. Hunter, Seymour, Conn., assignors to United States Rubber Company, New York, N. Y., a corporation of New Jersey No Drawing. Application July 8, 1953,
Serial No. 366,863

5 Claims. (Cl. 260—724)

This invention relates to a process of producing cellular rubber by means of azodicarbonamide as a chemical blowing agent. In particular, the invention resides in the discovery that the combination of azodicarbonamide with a glycol or with glycerol is very much more effective as a blowing agent for rubber than is azodicarbonamide per se.

Azodicarbonamide has been considered of potential interest as a blowing agent for plastics by German technologists (Stevens and Emblem, Ind. Chemist 27, 391–4 (1951) and Final Report No. 1,150, British Intelligence Objective Subcommittee (BIOS), Item No. 22). These workers evidently did not succeed in applying the material to the blowing of rubber since the statement is made that "the decomposition temperature is too high for use in rubber." Our efforts to produce a practical cellular rubber product with azodicarbonamide by itself confirm the observation of the German workers.

When azodicarbonamide is used by itself for blowing rubber in the conventional manner the results are not satisfactory. We have found that it is possible by reducing the amount of accelerator to get a fair blow with this chemical alone but this extends the time of cure so that it is commercially undesirable. Moreover, the process is too sensitive for use under conditions prevailing in the ordinary rubber factory. Our invention provides a process of blowing with azodicarbonamide which permits such wide latitude in blowing conditions that it permits use under varying commercial conditions without requiring special modifications for every set of conditions.

Azodicarbonamide has proved to be a very superior blowing agent for producing cellular polyvinyl chloride. Although the chemical itself is yellow in color, the decomposition products are colorless and a cellular product is produced which is completely free of discoloration. Moreover, azodicarbonamide is capable of producing large volumes of gas on decomposition and the efficiency of the material as a blowing agent in polyvinyl chloride is high. Furthermore, cyanuric acid which is reported to be the principal decomposition residue has been described as non-poisonous. (Kirk-Othner Encyclopedia of Chemical Technology Interscience Encyclopedia, Inc., New York, volume 4, page 685.) It would be expected that azodicarbonamide should be a superior blowing agent for rubbery compositions. However, as has been indicated, it was found that azodicarbonamide does not function well as a blowing agent when used in such compositions.

The ineffectiveness of azodicarbonamide as a blowing agent in rubber has not been completely explained. It is possible that the decomposition temperature of the chemical itself (190–200° C.) is too high. However, this does not seem to be the complete explanation since, in the preparation of cellular polyvinyl chloride, temperatures as low as 160° C. have been very effective. If the assumption is made that the presence of plasticizers in the polyvinyl chloride composition are effective in lowering the decomposition temperature, it would be expected that the incorporation of the same plasticizers in the rubber composition would permit the blowing agent to decompose at normal curing temperatures to produce a cellular product. However, as will be seen in Example 11 below, the use of tricresyl phosphate, a satisfactory plasticizer in the preparation of cellular polyvinyl chloride, does not permit the preparation of a satisfactory cellular rubber.

We have now discovered that the incorporation of a specific class of substances into a rubber composition makes possible the practical production of a highly satisfactory cellular rubber product with azodicarbonamide as a blowing agent. Specifically, we have found that the polyhydroxy compounds selected from the group consisting of glycols and glycerol are very effective adjuvants to azodicarbonamide in the preparation of cellular rubbery compositions. By glycols we mean the aliphatic dihydric alcohols including both the alkane diols and hydrocarbon ether-diols, especially diethylene glycol and triethylene glycol. We generally prefer to use those glycols which contain not more than six carbon atoms per molecule.

Examples of polyhydroxy compounds which are useful as blowing adjuvants to azodicarbonamide in the production of cellular rubber compositions in accordance with our invention are:

Glycerol
Ethylene glycol
Propylene glycol (1,2)
Diethylene glycol
Triethylene glycol
Tetramethylene glycol (1,4)

The amount of the adjuvant used in the practice of our invention should be equal to at least 5 parts per 100 parts of rubber employed and can range upwardly from this value to as high as 50 parts. Usually we use from 5 to 10 parts of the adjuvant. It will be understood that the adjuvants also function as rubber softeners and that when they are used in the higher portions of the above range they can serve to replace equivalent amounts of conventional softeners.

The amount of azodicarbonamde used in the practice of our invention can vary widely depending upon many factors including the type of stock, density desired in the product, etc. We typically employ from 2 to 10 parts per 100 parts of rubber.

As will be obvious the stock temperature is kept below the point of decomposition of the blowing agent and below the point where pre-vulcanization of the mix would occur during and following incorporation of the blowing agent and the vulcanizing ingredients, respectively.

The temperature used to effect decomposition of the blowing agent will usually be of the order commonly employed for vulcanizing rubber, say from 250° to 350° F.

Our invention is particularly applicable with formulations based on natural rubber, rubbery copolymers of butadiene and styrene (GR–S), rubbery copolymers of butadiene and acrylonitrile (Buna N), rubbery copolymers of a major proportion of isobutylene and a minor proportion of aliphatic conjugated diolefin (Butyl) and neoprene (polychloroprene) but is not limited to such rubbers since it can be applied to any vulcanizable rubber. It will be understood that conventional compounding and vulcanizing ingredients are included in the formulation.

Any conventional blowing or expanding method can be used. We especially prefer to blow in such a way as to get a closed cell or substantially closed cell product. The manipulative methods of treating the compounded stock to obtain the expanded product are well-known and standard in the art. See for example, the article, "Cellular rubbers," by Gould, Rubber Chemistry and Technology, 17, pages 943–956 (October 1944). As previously indicated, we prefer to make a closed cell product. This can be accomplished in any manner which prevents rupture of the cells which would cause formation of a sponge type of product. Such methods are shown for example in Cuthbertson 2,291,213, Cooper 2,283,316, and Roberts et al. 2,299,593. As will be obvious, vulcanization must take place simultaneously with decomposition of the blowing agent, at least to a sufficient extent to retain the liberated gas and prevent collapse of the expanded structure.

Our invention can be used to expand any rubber mixture which cannot practically be blown with azodicarbonamide alone. It is applicable to rubber alone or to blends thereof with compatible resins, especially blends of a major proportion of rubber and a minor proportion of resin, e. g., those rubber-resin blends which are commonly used in the manufacture of shoe soling. Thus our invention provides an improved method of making expanded shoe soling.

A very important advantage of our invention is the unusually fine uniform cell structure obtained. The blowing agent and the adjuvant appear to cooperate in a unique manner to give this result.

An unusual aspect of our invention is that our adjuvant gives a greater extent of blow manifested by a larger blown product despite the fact that it activates the cure of the rubber compound. Normally one would expect activation of the cure to result in reduction in the blowing efficiency, it being well-known that ease of blow is decreased by increasing the rate of vulcanization.

In order to illustrate the novelty of the invention the following examples show procedures in which glycols and glycerol are utilized as adjuvants to azodicarbonamide in the preparation of cellular rubber. For comparison, azodicarbonamide in the absence of such an adjuvant is shown. All parts herein are by weight.

*Examples 1 to 11*

These examples were formulated according to the following schedule. Example 1 is the control. Examples 8 and 11 are included to show that other high-boiling organic liquid materials, namely dibutyl phthalate and tricresyl phosphate are inoperable.

Master batch:
GR–S ------------------------------------------- 100.0
Butadiene-styrene resinous copolymer (83–17) ------------------------------------------- 20.0
Coumarone-indene resin ----------------- 10.0
                                                                    ─────
                                                                    130.0

The master batch was mixed in a Banbury at 250° F. for 3 minutes.

A series of secondary master batches were then prepared as follows:

| Example | 1 | 2 | 3 | 4 | 5 | 6 | 7 | 8 | 9 | 10 | 11 |
|---|---|---|---|---|---|---|---|---|---|---|---|
| Master Batch | 130.0 | 130.0 | 130.0 | 130.0 | 130.0 | 130.0 | 130.0 | 130.0 | 130.0 | 130.0 | 130.0 |
| Zinc Oxide | 5.0 | 5.0 | 5.0 | 5.0 | 5.0 | 5.0 | 5.0 | 5.0 | 5.0 | 5.0 | 5.0 |
| Stearic Acid | 5.0 | 5.0 | 5.0 | 5.0 | 5.0 | 5.0 | 5.0 | 5.0 | 5.0 | 5.0 | 5.0 |
| Silica | 30.0 | 30.0 | 30.0 | 30.0 | 30.0 | 30.0 | 30.0 | 30.0 | 30.0 | 30.0 | 30.0 |
| Diethylene Glycol | | 4.0 | 5.5 | 7.0 | 8.5 | 10.0 | | | | | |
| Ethylene Glycol | | | | | | | 10.0 | | | | |
| Dibutyl Phthalate | | | | | | | | 10.0 | | | |
| Triethylene Glycol | | | | | | | | | 10.0 | | |
| Glycerol | | | | | | | | | | 10.0 | |
| Tricresyl Phosphate | | | | | | | | | | | 10.0 |
| Clay | 75.0 | 75.0 | 75.0 | 75.0 | 75.0 | 75.0 | 75.0 | 75.0 | 75.0 | 75.0 | 75.0 |
| Petrolatum | 13.0 | 13.0 | 13.0 | 13.0 | 13.0 | 13.0 | 13.0 | 13.0 | 13.0 | 13.0 | 13.0 |
| #8 oil | 20.0 | 20.0 | 20.0 | 20.0 | 20.0 | 20.0 | 20.0 | 20.0 | 20.0 | 20.0 | 20.0 |
| Sulfur | 3.5 | 3.5 | 3.5 | 3.5 | 3.5 | 3.5 | 3.5 | 3.5 | 3.5 | 3.5 | 3.5 |

Each of these stocks was then compounded with 4.5 parts of azodicarbonamide as a blowing agent, 1.5 parts of dibenzothiazyl disulfide, 0.6 part of diphenyl guanidine and 0.6 part of tetramethyl thiuram disulfide.

The resulting stocks were blown and cured by heating in a completely filled mold for 7.5 minutes at the temperature of steam at 80 pounds per square inch gauge. The method of blowing and curing was such as to give a product which was essentially closed-cell. The percent blow (by which is meant the ratio, expressed in percentage, of the volume of the blown piece to the volume of the unblown piece) for each stock was then determined. The data were as follows:

| Example | 1 | 2 | 3 | 4 | 5 | 6 | 7 | 8 | 9 | 10 | 11 |
|---|---|---|---|---|---|---|---|---|---|---|---|
| Percent Blow | 106 | 118 | 143 | 217 | 201 | 201 | 215 | 120 | 210 | 180 | 111 |

Comparison of percent of blow for Examples 3 to 7, 9 and 10 (containing the chemicals of the invention along with azodicarbonamide) with Example 1 (containing azodicarbonamide alone) shows the outstanding effectiveness of the glycols and glycerol in improving the blowing properties of azodicarbonamide in the rubber mix. The inadequacy of such plasticizers for polyvinyl chloride as tricresyl phosphate (Example 11) and dibutyl phthalate (Example 8) emphasizes the unique property of the glycols and glycerol in improving the blowing characteristics of azodicarbonamide in a rubber stock. Example 2 shows that use of less than 5 parts of the adjuvant does not give an adequate blow.

Having thus described our invention, what we claim and desire to protect by Letters Patent is:

1. A method of making gas-expanded rubber which comprises incorporating 2 to 10 parts of azodicarbonamide and 5 to 50 parts of a polyhydroxy compound containing not more than six carbon atoms per molecule selected from the group consisting of alkane diols, aliphatic hydrocarbon ether-diols and glycerol in 100 parts of a vulcanizable rubber, said rubber containing a vulcanizing agent and an accelerator, and subsequently heating the resulting mixture to decompose said azodicarbonamide and expand the mixture by the evolution of gas from said azodicarbonamide and vulcanize the expanded mixture.

2. The method of claim 1 wherein said compound is ethylene glycol.

3. The method of claim 1 wherein said compound is diethylene glycol.

4. The method of claim 1 wherein said compound is triethylene glycol.

5. The method of claim 1 wherein said compound is glycerol.

References Cited in the file of this patent

UNITED STATES PATENTS 2,360,049  Cuthbertson ------------- Oct. 10, 1944
2,440,893  Campbell ---------------- May 4, 1948

OTHER REFERENCES

Stevens et al.: Industrial Chemist (London), vol. 27, issue 320, September 1951, pages 391–394.

India Rubber Journal (London), August 16, 1952, pages 16, 18 and 19.